United States Patent
Benedetto

(10) Patent No.: US 12,141,344 B2
(45) Date of Patent: Nov. 12, 2024

(54) IMPROVING ACCURACY OF INTERACTIONS FOR GAZE-ENABLED AR OBJECTS WHEN IN MOTION

(71) Applicant: Sony Interactive Entertainment Inc., Tokyo (JP)

(72) Inventor: Warren Benedetto, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 135 days.

(21) Appl. No.: 17/880,191

(22) Filed: Aug. 3, 2022

(65) Prior Publication Data

US 2024/0045496 A1 Feb. 8, 2024

(51) Int. Cl.
*G06F 3/01* (2006.01)
*G06T 11/00* (2006.01)
*G06V 20/20* (2022.01)

(52) U.S. Cl.
CPC .............. *G06F 3/013* (2013.01); *G06T 11/00* (2013.01); *G06V 20/20* (2022.01)

(58) Field of Classification Search
None
See application file for complete search history.

(56) References Cited

U.S. PATENT DOCUMENTS

| | | | | |
|---|---|---|---|---|
| 2015/0331486 A1* | 11/2015 | Okubo | .................. | H04N 23/611 345/156 |
| 2018/0011533 A9 | 1/2018 | Marggraff et al. | | |
| 2020/0265649 A1* | 8/2020 | Chaurasia | .................. | G06T 7/70 |
| 2022/0026986 A1* | 1/2022 | Ballagas | ............... | G06F 3/0346 |
| 2022/0180842 A1 | 6/2022 | Singh | | |
| 2023/0019625 A1 | 1/2023 | Nakade et al. | | |

FOREIGN PATENT DOCUMENTS

CN 112181152 A 1/2021

OTHER PUBLICATIONS

Intl Search Report and Written Opinion, PCT/US2023/070287, dated Oct. 18, 2023, 12 pages.
Dietrich H et al: "Strategies for Gaze Stabilization Critically Depend on Locomotor Speed", NEUROSCIENCE, vol. 408, Jun. 1, 2019 (Jun. 1, 2019), pp. 418-429, XP085707892, ISSN: 0306-4522, DOI: 10.1016 / J. NEUROSCIENCE.2019.01.025 figures 1, 2, 3 p. 418, left-hand column, line 1 p. 419, left-hand column, line 35 p. 421, left-hand column, line 12—p. 428, left-hand column, line 27.

\* cited by examiner

*Primary Examiner* — Tapas Mazumder
(74) *Attorney, Agent, or Firm* — PENILLA IP, APC

(57) ABSTRACT

Methods and systems for providing augment reality overlay associated with a real-world object includes detecting a gaze target of a user viewing the real-world environment using a pair of AR glasses by tracking a gaze of the user. Position parameters affecting the gaze of the user are tracked and one or more attributes of the gaze target are selectively corrected to allow the user to maintain their gaze on the gaze target. An AR trigger element associated with the gaze target is triggered in response to the gaze of the user. The AR trigger element provides additional information related to the gaze target selected by the user.

19 Claims, 7 Drawing Sheets

Snapshot of jacket with AR price overlay extracted from a view of shop window ("pin" option)

Pinned jacket with AR price overlay maintained in view when user's view changes

Pinned jacket in shop window with AR price overlay (with occlusion object approaching)

Pinned jacket in shop window with AR price overlay (with occlusion object obscuring)

IMPROVING ACCURACY OF INTERACTIONS FOR GAZE-ENABLED AR OBJECTS WHEN IN MOTION

TECHNICAL FIELD

The present disclosure relates to detecting gaze-enabled augmented reality objects, and more particularly to improving accuracy of detecting the gaze-enabled augmented reality objects when in motion.

BACKGROUND OF THE DISCLOSURE

When a user is wearing an augmented reality (AR) device, such as smart glasses, some objects in the real-world will be augmented with additional information that can only be viewed in AR. To avoid cognitive overload, the additional information may be hidden till the user interacts with the AR object in some way. One way for the user to interact with an AR object is by gazing at the AR object, and the AR device is equipped with gaze tracking capabilities to detect the gaze interaction of the user. The AR object may be equipped with an AR trigger element that is associated with an AR display. In response to detecting the gaze of the user on the AR object, the AR trigger element can be triggered to render the associated AR display.

Typically, just looking at a real-world object is not enough. For instance, if a quick glance were to trigger the AR display, it can create visual chaos and sensory overload. Further, identifying an appropriate real-world object from amongst a plurality of real-world objects within the real-world environment as a target of the user's gaze, is easy if the person and the real-world object are both stationary. If one or both of the person and the real-world object are in motion, it can be difficult or impossible for the gaze to remain fixed on the target object (e.g., real-world object) for sufficient amount of time for the AR display to be triggered.

It is in this context that the invention arises.

SUMMARY

Implementations of the present disclosure relate to systems and methods for detecting interaction of a user with an object by tracking their gaze and triggering an augmented reality (AR) overlay associated with the object. The triggering of the AR overlay results in information associated with the object to be rendered for viewing through a pair of AR glasses. The gaze tracking requires the gaze to remain fixed on a specific point (e.g., a real-world object or gaze target) for a specific period of time in order to trigger the AR overlay.

However, a number of position parameters can affect the difficulty of maintaining the gaze of the user on the gaze target long enough to trigger the AR overlay. Some of the factors that can affect the user's gaze from staying focused on the gaze target correspond to various positional parameters related to the user and the gaze target including motion of the user while the gaze target is stationary, motion of the gaze target while the user is stationary, motion of both the gaze target and the user, speed, direction of movement of the user, speed, direction of movement of the gaze target, changes to aforementioned positional parameters, etc.

To reliably identify the gaze target, relevant positional parameters affecting the gaze of the user are identified and the dimensions of the gaze target are proportionally adjusted. The adjustment to the gaze target allows the gaze of the user to better focus on the gaze target. In various implementations, the adjustment to the gaze target can be done in two-dimensions or three dimensions. Thus, the adjustments to the gaze target are based on the gaze target being stationary while the user is moving. Additionally or alternately, when it is determined the gaze target is moving in relation to the user, adjustments to the gaze target are done to accommodate the motion of the gaze target. Further, when it is determined that the gaze target and the user are both moving and the gaze target is moving in a different direction than the user, then the gaze target is adjusted to take into account the directions of motion of the user and the gaze target. By addressing the positional parameters that affect the gaze of the user, it is possible for the user to maintain their gaze on the gaze target long enough to trigger the AR overlay. Further, the AR overlay is maintained long enough by taking into consideration these positional parameters so as to allow the user to mentally process the information included in the AR overlay.

A method for providing an augment reality (AR) overlay is disclosed. The method includes detecting a gaze target of a user viewing a real-world environment through a pair of AR glasses. The gaze target is a real-world object in the real-world environment and is identified by tracking a gaze of the user. The gaze target is associated with an AR trigger element. One or more positional parameters affecting the gaze of the user are tracked based on a relative position of the user to the gaze target. One or more attributes of the gaze target are selectively corrected in proportion to the one or more positional parameters so as to allow the user to maintain their gaze on the real-world object representing the gaze target. The AR trigger element associated with the gaze target is activated when the gaze of the user directed toward the gaze target exceeds a pre-defined threshold of time. The activation of the AR trigger element causes an AR overlay to render in association to an image of the real-world object at a display portion of the AR glasses as the user is viewing the real-world environment. The AR overlay provides information related to the real-world object representing the gaze target.

In another implementation, a method for providing augmented reality overlay is disclosed. The method includes tracking a gaze of a user to identify a gaze target that has captured an interest of the user. The gaze target identifies a real-world object in the real-world environment viewed by the user through a pair of AR glasses. The gaze target is associated with an AR trigger element. Movement of the user in relation to the gaze target is detected. The movement of the user is analyzed to identify one or more position parameters of the user. The one or more attributes of the gaze target are selectively corrected in proportion to the position parameters so as to allow the user to maintain the gaze on the real-world object representing the gaze target. The AR trigger element associated with the gaze target is activated when the gaze of the user on the gaze target exceeds a pre-defined threshold of time. The activation causes the AR overlay to be rendered in association to an image of the real-world object at a display portion of the pair of AR glasses as the user is viewing the real-world environment. The AR overlay provides information related to the real-world object.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
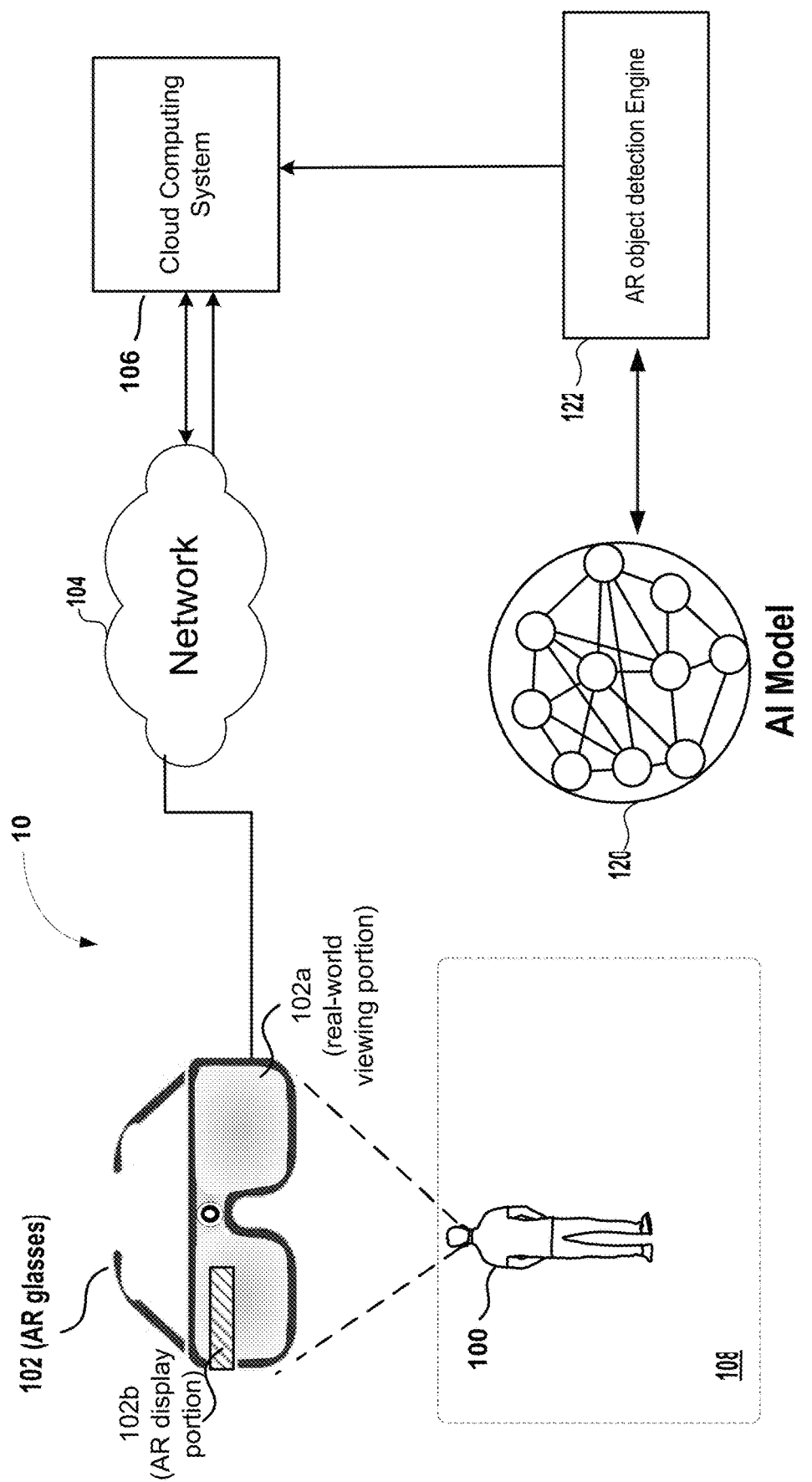
FIG. 1 provides a simplified block diagram of a system used to provide augmented reality (AR) overlay for a real-world object viewed through a pair of AR glasses, in accordance with one implementation of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As humans are increasingly living their lives online and in virtual worlds, there is growing interest in devices that allow the users to have a satisfying interactive experience. Some of the devices, such as head mounted displays (HMDs), provide a truly immersive experience by fully blocking the real-world environment for the users so that the users can interact in the virtual world without interruption. Alternately, the users can use augmented reality (AR) devices to interact with the virtual world. The AR devices allow the users to interact with the virtual objects while providing the users with the ability to see through and experience the real-world environment in their vicinity. Thus, when a user is wearing an AR device, such as smart glasses, etc., the user is able to view the real-world objects and additional information that can be viewed only in AR, wherein the additional information relates to one or more of the real-world objects.

To avoid cognitive overload, the additional information is generally hidden and activated only when the user interacts with the related real-world object. The real-world object can be equipped with an AR trigger element, such as a placard with QR code, etc., and when the user scans (i.e., activates) the QR code, the additional information related to the real-world object is rendered. To avoid visual chaos to the user viewing the real-world scene through the AR devices (e.g., pair of AR glasses), the AR trigger element is activated to render the additional information after ascertaining the user's interest in the real-world object lasts for a defined period of time and is not fleeting. The user's interest can be determined by tracking the user's interaction (e.g., user's gaze) with the real-world object and ensuring that the user's interaction at the real-world object lasts for at least some period of time.

The gaze interaction with a real-world object, for example, requires the gaze to remain fixed on the real-world object and last for a specific period of time in order to trigger the AR overlay. Tracking gaze interaction is easy when the real-world object and the user are both at a standstill (i.e., stationary). However, if any one or both of the real-world object and the user are in motion, a number of position parameters, such as type of motion, speed of motion, direction of motion, etc., can make it difficult or impossible for the gaze to remain fixed on the real-world object and last for the specific time period in order to trigger the AR display. To mitigate the issues due to the motion of the user and/or the real-world object, the position parameters affecting the user's gaze on the real-world object (i.e., gaze target) are identified and one or more attributes of the gaze target are adjusted in proportion to the one or more position parameters so that the user is able to maintain their gaze on the gaze target for a certain time period without needing to change their motion.

The speed and/or direction of motion of the user when the user is in a moving vehicle, such as in a car or on a bike, can make it hard for the user to maintain their gaze on a real-world object sufficiently long to consider the real-world object as a gaze target. The faster the motion, the harder it is to detect the gaze of the user being fixed on the gaze target long enough to accurately establish the user's interest in the gaze target in order to trigger a corresponding AR overlay. In addition to the speed and direction of motion of the user, other attributes related to the motion need to be taken into consideration in order to identify and adjust the one or more position parameters of the gaze target. For example, when the user is walking, their gaze would naturally bounce a bit based on their gait. A slower gait has minimal bounce and allows the user to maintain their gaze on the gaze target longer resulting in a more accurate gaze detection, whereas a faster gait (i.e., fast-walking, jogging, running, sprinting) has greater bounce and will result in a less accurate gaze detection. Thus, attributes related to the gait will have to be taken into consideration in addition to the speed and direction.

In order to accurately identify the gaze target on which the user's gaze is maintained for a defined period of time, an AR object detection engine executing on a computing system is used to track the user's motion, identify the gaze target based on the gaze of the user, and adjust one or more dimensions of the identified gaze target in proportion to one or more attributes of the user's motion. For example, the user's gait (i.e., user's motion) can be tracked and the gaze target adjusted in proportion to amplitude of motion resulting from the user's gait. Instead of or in addition to motion of the user, the gaze target itself can be in motion and the AR object detection engine tracks the motion of the gaze target in relation to the user and adjusts one or more attributes of the gaze target to account for the motion of the gaze target.

The adjustment to the one or more attributes enable the user to maintain their gaze on the gaze target long enough to trigger the AR overlay associated with the gaze target. The AR overlay can be rendered long enough for the user to view the information. In some cases, an image of the gaze target is also captured and rendered in association to the AR overlay information and rendering of such data can be done even after the user has passed the gaze target.

With the general understanding of the disclosure, specific implementations will be described with reference to the various drawings.

FIG. 1 illustrates an implementation of a system 10 for identifying a gaze target and providing an overlay of information associated with the gaze target on a display portion of a pair of smart glasses 102. In some implementations, the pair of smart glasses 102 is configured as an augmented reality (AR) device, wherein the user is able to see through and view the real-world environment in the vicinity of the user as well as the augmented reality (AR) content associated with a real-world object. The view of the real-world environment is seen via a real-world viewing portion 102a and the AR content is viewed through an AR display portion 102b of the smart glasses 102. As the smart glasses 102 is configured for viewing AR content, the smart glasses 102 is also referred to herein as AR glasses 102.

As shown in FIG. 1, a user 100 is shown to be physically present in a real-world space 108 and viewing real-world environment through a pair of AR glasses 102. The real-world environment includes a plurality of real-world objects and the user 100 is shown to be stationary. In the implementation illustrated in FIG. 1, the pair of AR glasses 102 is connected wirelessly to a cloud computing system 106 via a network 104. In other implementations, the pair of AR glasses 102 can be connected to the cloud computing system 106 via a computing device (not shown) located in the real-world space 108 in which the user is operating. The connection between the pair of AR glasses 102 and the computing device can be via a wired or wireless connection. The user 100 can interact with an interactive application or provide input pertaining to a real-world object via a user interface provided at the AR glasses 102 or via a controller (not shown) that is communicatively connected to the AR glasses 102 and/or the cloud computing system 106. The input provided by the user can be transmitted to the cloud computing system 106 over the network 104 and used to affect a state of the interactive application, for example. Alternately, the input pertaining to the real-world object provided by the user can be processed by the cloud computing system 106 to identify and return additional information associated with the real-world object to the pair of AR glasses 102 for rendering. Depending on the way the pair of AR glasses 102 is configured, an AR object detection engine 122 can be executing on a processor of the pair of AR glasses 102 or on the computing device coupled to the pair of AR glasses 102 or on the server of the cloud computing system 106. The AR object detection engine 122 is used to process the user input to confirm selection of the real-world object and to identify the additional information pertaining to the real-world object.

In some implementations, the user can be moving and the real-world objects in the real-world environment can be stationary. In alternate implementations, one or more of the real-world objects in the real-world environment can be moving while the user can be stationary. In yet other implementations, both the user and the one or more of the real-world objects can be moving. In all such implementations, the view of the real-world environment keeps changing, with different real-world objects coming into view of the user 100. Some of the real-world objects in the real-world environment can be associated with an AR trigger element that can be used to initiate augmented display (i.e., AR display). One example of the AR trigger element associated with the real-world object can be a placard or tag with a quick response (QR) code. The AR object detection engine 122 is configured to track the real-world objects equipped with the AR trigger elements, track the gaze of the user 100 as the user is moving in the real-world environment in order to identify a real-world object (i.e., gaze target with an associated trigger element) that captures the attention of the user 100. The attention of the user on a real-world object can be determined by tracking the gaze of the user and determining that the gaze of the user on the real-world object lasts for at least a defined period of time to establish the real-world object as the user's gaze target. However, due to movement of the user and/or the real-world object, it can be very difficult or impossible for the user's gaze to remain fixed on the real-world object for a long enough period to establish the user's interest in the real-world object as the gaze target and to trigger AR display associated with the real-world object. Various position parameters (e.g., type of motion, speed of motion, and direction of travel, etc.,) associated with the user and/or the gaze target due to movement of the user and/or the real-world objects can influence the user's gaze to remain fixed at a particular point.

The AR object detection engine 122 takes into consideration the position parameters associated with the movement of the user and/or the real-world objects and proportionately adjusts one or more dimensions of the real-world object on which the user's gaze is detected to determine if the user's gaze continues to be on the real-world object for a defined period of time (e.g., 5 seconds, 3 seconds, etc.,) to establish the real-world object as the gaze target of the user. Once the gaze target is determined, the dimensions of the gaze target are adjusted in accordance to position parameters affecting the gaze of the user so as to allow the user to maintain their gaze on the gaze target sufficiently long to instantiate the AR display associated with the gaze target. Details of tracking of the user's gaze and adjustment of the dimensions of the gaze target will be described in detail with reference to FIGS. 2-5B. Once the gaze target of the user in the real-world environment is established, the AR trigger element associated with the gaze target is activated. The activated AR trigger element provides the information associated with the gaze target for user consumption.

Figure 2:
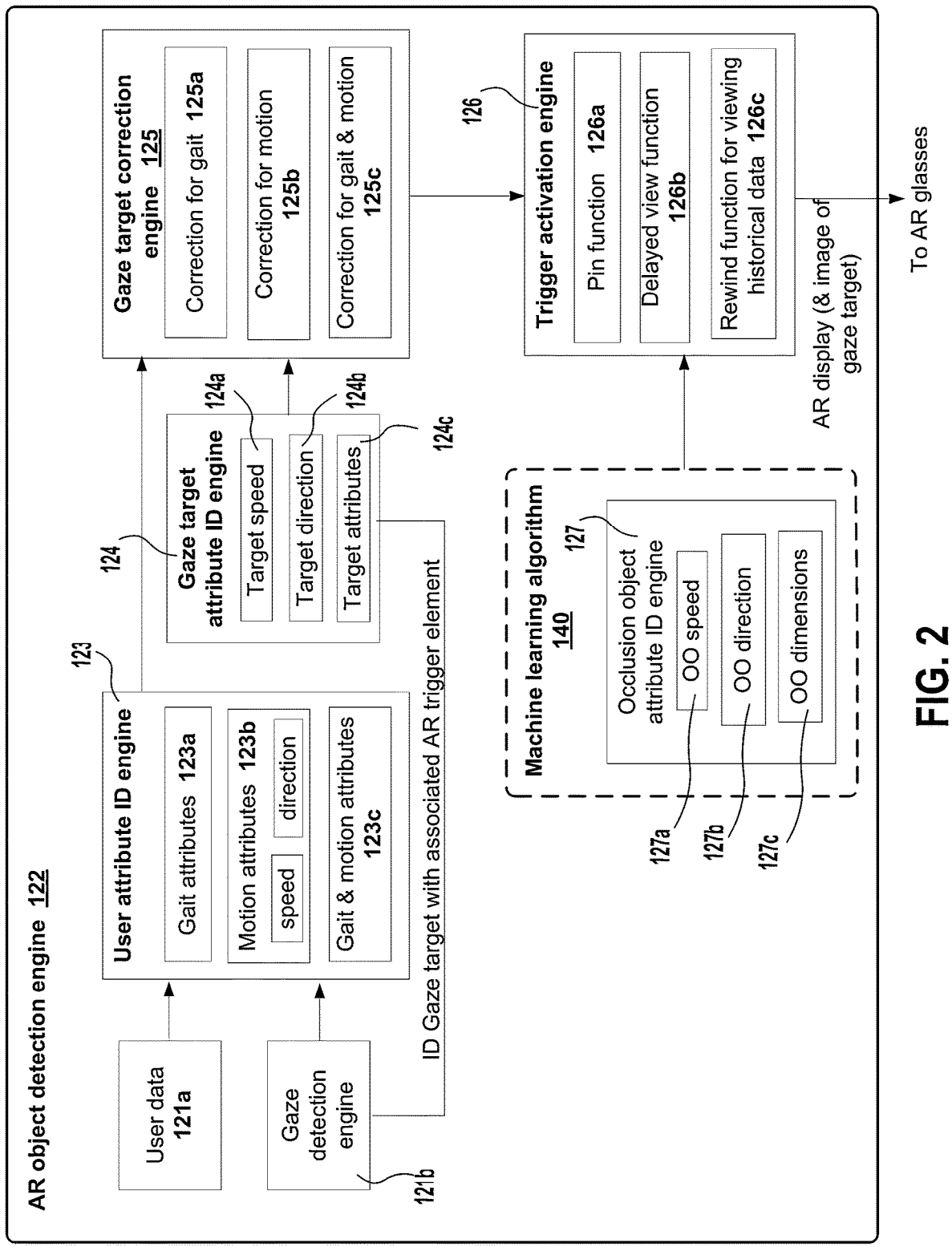
FIG. 2 illustrates various modules of an AR object detection engine used for rendering the AR overlay of a real-world object, in accordance with one implementation of the present disclosure.

FIG. 2 illustrates various modules of an AR object detection engine 122 that is used to establish a gaze target of a user in a real-world environment and render AR display for the gaze target at a pair of AR glasses for user consumption, in one implementation. The AR object detection engine 122 includes a plurality of modules. The AR object detection engine 122 can be a hardware component or a software component. In some implementations, some of the modules of the AR object detection engine 122 can be implemented as hardware components of an application specific integrated circuit (ASIC). Broadly speaking, the AR object detection engine 122 is used to identify position parameters affecting gaze of the user in a real-world environment, attributes associated with the user or the gaze target, proportionately adjust dimensions of the gaze target to assist the user in maintaining their gaze on the gaze target, and activate the AR trigger element associated with the gaze target. Once the gaze target is identified, the AR object detection engine 122 can also predict when a second object will occlude the gaze target based on an analysis of the movement of the second object in the real-world environment, identify the attributes related to the movement of the second object, and determine a duration of time the AR overlay has to be maintained due to occlusion of the gaze target by the second object.

The AR object detection engine 122 first identifies the user wearing the pair of AR glasses 102 by retrieving and verifying the user data (121a) against the user identification information captured of the user 100 wearing the pair of AR glasses 102. The capturing of the identification information and verification of the user can be carried out using any known standard or proprietary process or any new process available at the AR object detection engine 122. Upon successful verification, the AR object detection engine 122 engages user attribute ID engine 123 to track the user to determine if the user is stationary or moving around in the real-world environment. The user is tracked by first mapping the real-world environment in the vicinity of the user. The mapping can be in two-dimensions or three-dimensions. Using the mapping of the real-world environment, the attributes including the location of the user and the real-world objects in the real-world environment are determined. The location of the user in relation to the real-world objects are used by the attribute ID engine 123 to determine if the user is moving and the real-world objects are stationary, or if the real-world objects are moving and the user is stationary, or if the real-world objects and the user are moving in relation to one another.

Once the user is successfully verified and the user and the real-world objects attributes determined, a gaze detection engine 121b is engaged, in one implementation, to determine the gaze of the user. The gaze detection engine 121b engages inner facing cameras disposed on the pair of AR glasses 102 and/or other image capturing devices coupled to the pair of AR glasses 102 to capture images of the user's eyes and use the data captured by the image capturing devices/cameras to determine a gaze direction of the user. The gaze direction is then used to identify a real-world object in the real-world environment that is in the direction of the user's gaze. The identified real-world object is established as the gaze target of the user when the gaze of the user on the identified real-world object lasts at least for a defined period of time. Once the gaze target of the user is established, the user's and the real-world objects attributes are analyzed to identify position parameters (including motion characteristics) of the user and the real-world objects. The position parameters of the user and the real-world objects are used to determine the movement of the user and/or movement of one or more real-world objects so that adjustment to the gaze target can be made to keep the gaze of the user fixed on the gaze target.

The movement of the user is tracked using the mapping of the real-world environment and the various data captured by a plurality of sensors and devices. For example, the mapping and the images captured by the sensors (e.g., outward facing cameras and other image capturing devices) can be analyzed to determine if the user is moving around or stationary. Similarly, data captured by inertial measurement unit sensors (IMUs including gyroscopes, magnetometers, accelerometers, GPS, etc.) disposed in the pair of AR glasses 102 can be used to determine if the user 100 wearing the pair of AR glasses 102 is moving or stationary. When the user attributes ID engine 123 detects the user moving about in the real-world environment, the data captured from the various sensors/devices are used to determine the various position parameters (related to gait and motion) that can affect a gaze of the user due to the user's movement in the real-world environment.

As previously noted, the gait of the user when the user is walking causes their gaze to bounce. A lower gait has less bounce and can therefore result in a more accurate gaze, while a faster gait resulting from fast-walking, jogging, running, sprinting has greater bounce and can result in a less accurate gaze. When the user is walking and sets their gaze on the gaze target (i.e., a trigger-element-enabled real-world object) within the real-world environment, the user has to slow their gait in order to continue to maintain their gaze on the gaze target. To avoid the user from getting into unsafe situations while continuing to maintain their gaze at the gaze target when moving (e.g., due to slowing their gait when they are in the middle of the street), the user attributes ID engine 123 tracks the gait of the user and identifies the characteristics of the gait (123a). Some of the characteristics of the gait identified from the user attributes include intensity of the gait (e.g., slow or fast), amplitude of the gait (i.e., level of bouncing), length of stride, etc., using data captured from various sensors/devices associated with the pair of AR glasses 102.

Similar to walking, when the user is in motion (i.e., riding), depending on the speed of motion, it can be difficult for the user to continue to fix their gaze on the gaze target long enough to trigger an associated AR overlay. The user can be driving or riding in/on a vehicle (e.g., car, bike, train, etc.) or some other type of moving surface, such as a moving sidewalk, escalator, etc. As with gait, the faster the motion of the user, the harder it will be to continue to keep the gaze of the user on the gaze target. To enable the user to fix their gaze on the gaze target, the characteristics of the motion of the user are identified from the user attributes. The characteristics of the motion are examined and used to adjust the gaze target to allow the user to continue their gaze on the gaze target. The motion is a vector quantity and has at least two relevant characteristics—speed and direction. The data captured by the sensors and/or devices are analyzed to determine the speed and direction of the user's motion. In some implementations, the characteristics of the user's motion in the real-world environment are considered independent of the gait (123b) for correcting the gaze target. In other implementations, the characteristics of the user's motion are considered in conjunction with the attributes of the gait to correct the gaze target (123c). The data from the analysis of the user's movement are provided as input to the gaze target correction engine 125 for further processing.

Instead of or in addition to tracking the motion and/or gait of the user, the AR object detection engine 122 is also configured to track the real-world objects within the real-world environment of the user to determine select ones of the real-world objects that are stationary and select other ones of the real-world objects that are moving. In some implementations, only the real-world objects with associated AR trigger elements are tracked. In other implementations, all the real-world objects in the real-world environment are tracked. When a real-world object moves around in the real-world environment, the real-world environment and hence the view of the real-world environment changes in relation to the movement of the real-world object. A gaze target attribute identification engine 124 is engaged by the AR object detection engine 122 to identify the real-world object in motion based on the attributes of the real-world object captured using the plurality of devices and sensors. And when the real-world object is a gaze target of the user, the position parameters and other characteristics of motion of the real-world object (i.e., gaze target) that affect the gaze of the user are evaluated. In one implementation, the evaluation includes determining speed of motion (124a), the direction of motion (124b) and other characteristics (124c), such as type of the gaze target, dimensions of the gaze target, physical characteristics, etc. These characteristics and position parameters are provided to the gaze target correction engine 125 for further processing.

The gaze target correction engine 125 analyzes the data pertaining to the user's movement and/or the gaze target's movement to determine an amount of correction required for the gaze target in order to allow the user to maintain their gaze on the gaze target. In one implementation, dimensions of the gaze target are adjusted in proportion of the user's gait 125a. For example, the dimensions of the gaze target can be adjusted in proportion to the amplitude of the user's gait. As noted previously, as the bounce of the gait increases due to change in the user's gait, (i.e., when the user switches from walking to jogging to running), the gaze target's size and proportions are altered to match with the amplitude of the user's gait.

Figure 3A:
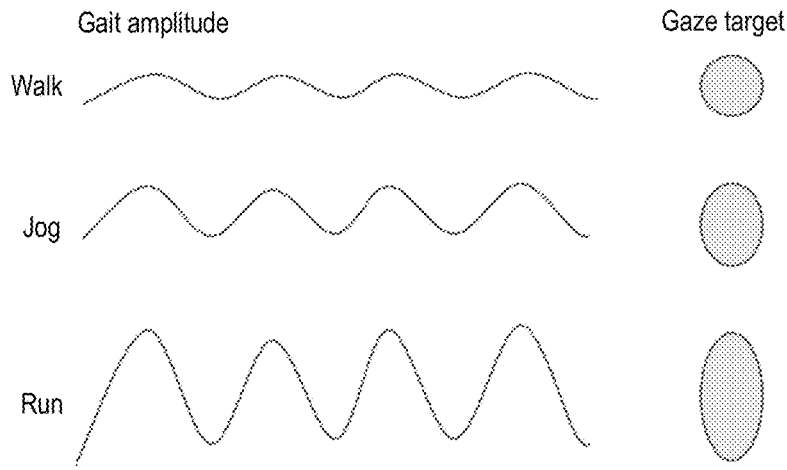
FIG. 3A illustrates a simple example of correcting dimensions of a gaze target in response to gait of a user moving relative to the gaze target, in accordance with one implementation of the present disclosure.

FIG. 3A illustrates some examples of using the amplitude of the user's gait to proportionally adjust the size of the gaze target, in one implementation. FIG. 3A shows the amplitude of the gait of the user when the user is walking, jogging and running. As can be seen the amplitude of the user's gait when jogging has notably increased from the amplitude when the user was walking. Similarly, the amplitude of the user's gait when running is notably greater than the amplitude when the user was jogging or walking. The size and proportions of the gaze target are altered to match with the corresponding amplitude determined from the gait when the user is walking, jogging or running. The increase in the size and proportion of the gaze target makes it easier for the user to maintain their gaze on the gaze target without having to affect their gait. FIG. 3A illustrates the tracking and adjustments made to the gaze target in two dimensions (2D). The aforementioned implementation can be extended to accommodate tracking and adjustments in three dimensions (3D) as well. The gaze target correction engine 125 is configured to not only track the up-down motion, but also forward-backward and left-right motions of the user. Thus, the 2D circular gaze target illustrated in FIG. 3A can instead be represented by a 3D sphere and the distortion in proportion to the user's gait in (x, y) space (i.e., 2D space) illustrated in FIG. 3A can be represented by distortions in proportions to the user's gait in (x, y, z) space (i.e., 3D space) as well.

Referring back to FIG. 2, similar to the gait, the size and proportion of the gaze target can be dynamically adjusted to accommodate the characteristics of motion identified from the user's and/or the gaze target's motion in the real-world environment. Just like with respect to gait, the speed and direction (i.e., characteristics of motion) can be tracked in 2D or 3D and the size and proportion of the gaze target can be adjusted accordingly in 2D or 3D (125b).

Figure 3B:
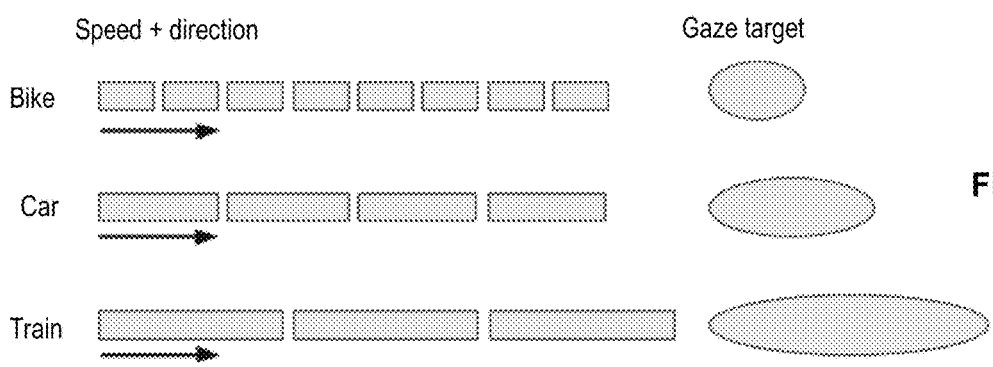
FIG. 3B illustrates a simple example of correcting dimensions of a gaze target in response to motion of a user in relation to the gaze target, in accordance with one implementation of the present disclosure.

FIG. 3B illustrates one such example wherein the characteristics of motion of the user are tracked and the corresponding size and proportions of the gaze target are distorted or altered. The example in FIG. 3B shows characteristics of motion when the user is riding on a bike, when riding in a car, and when riding in a train. In the illustration of FIG. 3B, sizes of the rectangle correspond to the speed at which the user is traveling when biking, when riding in a car, and when riding in a train. As illustrated, the speed when the user is riding the bike is smaller than when the user is driving a car, which is shown to be smaller than when the user is riding in a train. As with the gait, the size and proportions of the gaze target are altered to accommodate the speed and direction of the user's motion. The motion is tracked in 2D and the gaze target is shown to be altered in 2D but can be extended to the motion being tracked in 3D and the gaze target shown to be altered in 3D as well. In some implementations, the direction of the user's motion dictates the direction in which the gaze target is altered. Instead of or in addition to tracking the user's motion and dynamically altering the size and dimensions of the gaze target, the motion of the gaze target can be tracked and the size and dimensions of the gaze target proportionately altered to match with the characteristics of motion of the gaze target.

In some implementations, based on the analysis of attributes of the gaze target and the user, it may be determined that both the user and the gaze target are in motion. Further, it may be determined from the motion characteristics that the gaze target is moving in the same direction as the user. In such implementations, the speed of motion of the user is compared with the speed of motion of the gaze target. If the gaze target is moving at the same speed as the user, then the size and dimensions (i.e., attributes) of the gaze target is not altered. This is because the user will be able to keep their gaze fixed on the gaze target during the motion of both the user and the gaze target. If, on the other hand, the direction of motion of the user is in the opposite direction from the motion of the gaze target and/or the speed of motion of the user is different from the speed of motion of the gaze target, then the size and dimensions of the gaze target are proportionately altered to accommodate for the difference in the speed and/or the direction of the user and the target. For example, a gaze target moving in an opposite direction to the direction of motion of the user but at the same speed, the gaze target will appear to go by "faster" and the direction and speed of the gaze target needs to be factored into the equation when correcting the size and dimensions of the gaze target.

In some implementations, the motion of the user and/or the gaze target and the gait of the user can all be considered when correcting the size and dimensions of the gaze target (125c). In these implementations, the alterations to the gaze target take into consideration the speed and direction of motion of the user, the gaze target, as well as the attributes of the gait of the user.

Figure 3C:
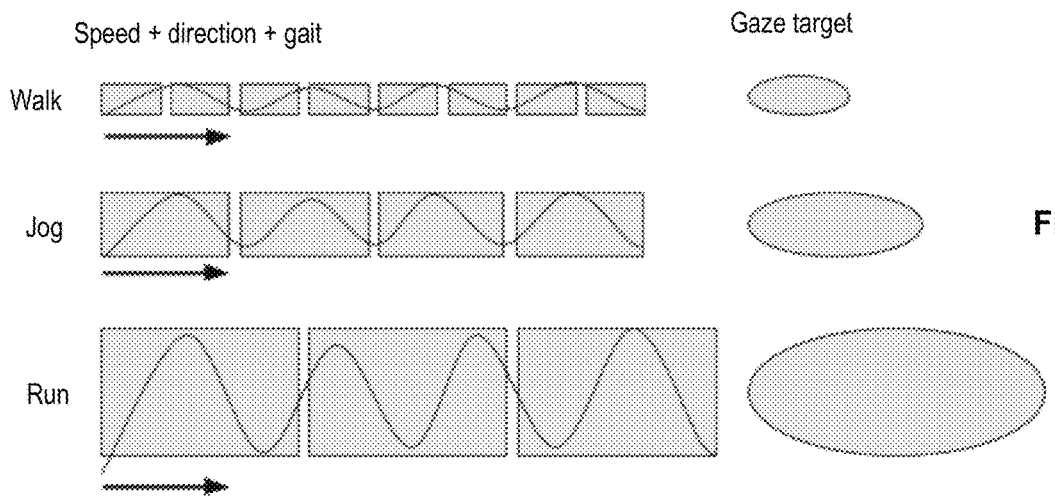
FIG. 3C illustrates a simple example of correcting dimensions of a gaze target in response to gait and motion of a user moving in relation to the gaze target, in accordance with one implementation of the present disclosure.

FIG. 3C illustrate an example of one such implementation, wherein a combination of characteristics (i.e., speed and direction) of motion and gait of the user are considered in proportionately adjusting the size and dimensions of the gaze target. The motion of the user is shown to be related to walking, jogging and running. The size and dimensions of the gaze target is altered by taking into consideration all three inputs (i.e., speed, direction and gait) simultaneously, with the adjustment increasing as the user progresses from walking to jogging to running. Although the example illustrated in FIG. 3C is shown in 2D the same can be extended to 3D as well.

Once the gaze target is identified with certainty based on the gaze of the user, details of the gaze target are provided to the trigger activation engine 126. The gaze target is associated with an AR trigger element, which when triggered will render an AR overlay. The trigger activation engine 126 tracks the amount of time the user's gaze is on the gaze target and upon determining that the amount of time on the gaze target has lasted for at least a predefined period of time, activates the AR trigger element associated with the gaze target. The activated AR trigger element provides additional information related to the gaze target for rendering on the AR display portion 102a of the pair of AR glasses 102 as AR overlay. In some implementations, the AR overlay is rendered along with a snapshot of the gaze target captured by an image capturing device upon detecting the user's gaze on the gaze target. The AR overlay is rendered in relation to the snapshot.

In some implementations, the AR overlay will be visible long enough for the user to mentally process the information included in the AR overlay. In some implementations, the AR overlay is rendered as long as the gaze target is being held by the user's gaze and when the gaze is broken, the AR overlay is removed. In some implementations, the length of time the AR overlay is rendered as an overlay may not be sufficient for the user to process the information included in the AR display. This may be due to the gaze target and/or the user's motion. For example, if the user is driving in a car, the user may see a billboard on a side of a street with an AR overlay-enabled gaze target. The user's gaze on the motion-adjusted gaze target triggers the AR overlay. But if the car passes the billboard before the user has finished reading the information included in the AR overlay, the user's gaze will be broken as the car passes gaze target (i.e., billboard) and the AR overlay will disappear with the gaze target. In order to allow the user enough time to process the information in the AR overlay even after the user's gaze on the gaze target is broken, a "pin" function (126a) is provided by the AR object detection engine 122, in some implementations.

A user can select the pin function 126a to indicate that the user wants the AR overlay to remain in place even after the user's gaze on the gaze target is broken. The pin function (126a) can be provided on a user interface for user selection. In some implementations, the user interface can be a gaze-based interface that can be operated by a blink or wink of the eye(s) of the user. In other implementations, the user interface can be operated by a voice command or a gesture or a touch or a user input. When the user selects to pin the AR overlay, the AR overlay will stay in view for a period of time after the gaze target is no longer visible. The period of time can be user-specified or can be a preset period. In some implementation, a "snapshot" of the gaze target is captured, in response to detecting the user initiating the pin function, and the captured snapshot of the gaze target is rendered in association to the pinned AR overlay so as to provide proper content for the AR overlay. In one implementation, the user may be looking at a jacket in a shop window while passing in a car. The jacket is considered to be the user's gaze target upon detecting the user's gaze on the jacket has lasted for at least a pre-defined period of time. While passing the shop window, the user can activate the pin function. In response to the user activating the pin function, the trigger activation engine holds the AR overlay in view of the user for a defined period of time after the gaze target has been passed and, upon expiration of the defined period, remove the AR overlay from the display portion of the pair of AR glasses 102. Additionally, the trigger activation engine 126 issues a signal to an image capturing device associated with the pair of AR glasses 102 to snap a picture of the AR-trigger-enabled jacket and include the snapshot of the jacket with the AR overlay. The defined period of time for holding the AR overlay in view of the user can be defined based on amount of information included in the AR overlay, with the AR overlay having little information being held for a shorter period of time and the AR overlay with greater information being held for a longer period of time.

Figure 4A:
FIG. 4A illustrates an example of a gaze target extracted from a real-world environment with an AR overlay, in accordance with one implementation of the present disclosure.
Figure 4B:
FIG. 4B illustrates an example of an extracted gaze target with an AR overlay maintained in view when a view of the real-world environment changes, in accordance with one implementation of the present disclosure.

FIGS. 4A and 4B illustrate an example implementation of the "pin" function in action, in one implementation. A user may see a leather jacket in a shop window with an AR overlay of the price. The AR overlay is activated upon detection of the gaze of the user on the leather jacket exceeding a pre-defined period of time. FIG. 4A illustrates one such example wherein the leather jacket displayed at the shop window is shown with the price AR overlay being activated. Once the gaze target (i.e., leather jacket in the shop window) is identified, when the pin function is activated by the user passing the shop window, a snapshot of the leather jacket in the shop window is captured along with the price AR overlay. The captured image of the leather jacket with the AR overlay of the price is maintained in the user's view for a pre-defined period of time, for example. FIG. 4B shows the snapshot of the leather jacket with the AR overlay of the price maintained in the user's view even after the user has passed the shop window and the view of the real-world environment viewed by the user has changed to include a landscape with trees.

Referring back to FIG. 2, the user can opt for a "delayed view" option (126b) from a user interface in place of the pin function, in some implementations. The delayed view option may be beneficial to avoid the pinned AR overlay from blocking a portion of the display through which the user is viewing the real-world environment, for an extended period of time. When the delayed view option (126b) is selected, the snapshot of the gaze target captured along with the associated AR overlay is stored in a local database or in a remote database or cache memory for later retrieval. The stored view of the gaze target with the AR overlay can be recalled later by the user when it is safe for the user to view the gaze target with the AR overlay.

In some implementations, the user may opt for a "rewind" option (126c) from a user interface to allow the user to deal with passing gaze targets with associated AR overlay. For example, the rewind option may be provided to allow the user to "rewind" to previously-triggered targets. For example, a user driving a car may be passing a billboard and engage in a gaze-triggered AR overlay associated with a gaze target. The user may forget to activate the pin function or the delayed view function before the gaze target is out of view. In order to provide the user with an option to view these gaze targets, the trigger activation engine 126 may automatically store a history of certain number of last gaze-triggered AR overlays for later recall. In some implementations, the gaze-triggered AR overlays are for gaze targets that the user previously expressed interest in. In other implementations, the gaze-triggered AR overlays stored in the history may be for real-world objects that the user passed by. In such implementations, the user's gaze may not have been on any single passing real-world object as the plurality of real-world objects with the associated AR overlays may all be concentrated in one single portion of the real-world scene that the user is passing. In such situations, the images of the real-world objects are captured and provided to the user to see if the user is interested in any of the real-world objects with the associated AR overlay. For instance, the user may be driving by and passing a plurality of real-world objects with the associated AR overlays. In order to allow the user to sort through the plurality of real-world objects, the user can choose to "rewind" to see a previously-seen AR overlay, even after the gaze target is out of view. In some implementations, along with the AR overlays, snapshots of the respective gaze targets may also be stored so that when the user rewinds and views a certain AR overlay, the image of gaze target is also presented to provide content to the AR overlay. The identified AR overlays are forwarded to the display portion of the pair of AR glasses for user consumption. In some implementations, the real-world objects that are captured in the images can be ones that are associated with AR trigger elements. In some specific implementations, the images of the real-world objects captured and provided to the user when the rewind option is selected are for objects that the user has not expressed any interest in previously.

In some implementations, a situation can arise wherein a gaze target triggered via the user's gaze can be obscured. This can happen due to presence of some sort of occlusion where a second object appears or passes between the user and the gaze target. In some implementations, the occlusion can occur from a static second object, such as a tree, a billboard, a parked car, etc. In alternate implementations, the occlusion can occur from a moving second object, such as another car, a trolley, a pedestrian, etc. To account for these obstructions, a "grace period" is built into the viewing of an AR overlay that is activated in response to the user's gaze being obscured. The grace period allows the AR overlay to persist for an additional amount of time after the user's gaze on the gaze target is broken (i.e., the gaze target has moved out of view of the user due to occlusion). The AR object detection engine 122 can use one or more outward facing cameras associated with the pair of AR glasses 102 to capture images of the real-world objects and machine learning (ML) algorithm-based object recognition to build situational awareness of the status of the different real-world objects in the real-world environment and the occlusion state. The situational awareness is to identify real-world objects that are stationary and real-world objects that are moving in order to determine the cause of occlusion of the gaze target.

Using this information, the AR object detection engine 122 can recognize which one of the real-world objects (either stationary or moving object) will come between the user and the gaze target during a gaze-based interaction. A stationary object can occlude the gaze target from the user's view based on the movement of the gaze target and/or the user. Similarly, a moving object can occlude the gaze target from the user's view based on the motion of the moving object, the user and/or the gaze target. The AR object detection engine 122 can engage the ML algorithm to create and train an artificial intelligence (AI) module 120 by tracking the various position parameters that affect the user's gaze (i.e., position parameters related to motion of the user, the gaze target, and the one or more of the real-world objects that are stationary or in motion) and other characteristics of the user, the gaze target and the real-world objects obtained by tracking and analyzing motion and gait data of the user and motion data of the gaze target and/or the real-world objects.

The ML algorithm 140 uses the motion and gait data to identify a second object from the real-world objects that is approaching the gaze target and will come between the user and the gaze target during the gaze-based interaction, and predictively determine a grace period for viewing an AR overlay associated with the gaze target during the period when the second object is supposed to occlude the gaze target. For example, the ML algorithm 140 uses the attributes relating to the motion of the second object to determine when the second object approaching the gaze target is likely to occlude the gaze target, duration of time of such occlusion, etc. Based on the analyzed data, the ML algorithm 140 activates a grace period, wherein the grace period is identified to match the duration of time of the gaze target will be occluded by the second object. Activating the grace period causes the AR display associated with the gaze target to be maintained for the user consumption.

For example, an AR overlay is triggered in response to detecting the user selecting a gaze target. During the activation of the AR overlay, ML algorithm 140 with the object detection algorithm embedded within analyzes the data related to the various real-world objects of the real-world environment in which the user is present, and recognizes that a bus is approaching and will eventually come between the gaze target and the user. Responsively, the ML algorithm 140 engages an occlusion object attribute identification engine 127 to determine/calculate a size (i.e., OO dimensions 127c), direction of travel, speed, etc., of the bus. Using this data, the ML algorithm 140 determines duration of time the user's gaze will be obstructed by the bus, and activates a grace period matching the duration of time. The grace period activation allows the AR overlay to be maintained for the gaze-enabled gaze target. In some implementations, during the time the bus is occluding the gaze target, the AR overlay is superimposed over the bus. In some implementations, the superimposition is done in a manner that the AR overlay moves in relation to the movement of the bus. Once the bus has passed (i.e., no longer occludes the gaze target) and the user has re-established gaze contact with the gaze target, the AR overlay is removed from rendering on the bus. In some implementations, the AR overlay can continue to render alongside or in relation to the gaze target after the bus is no longer occluding the gaze target. This can happen when the period of time of rendering the AR overlay has not expired, or when the amount of information included in the AR overlay is large and the grace period is not sufficient for the user to consume the information included in the AR overlay. In some implementations, the time period for which the AR overlay is to be rendered can be user specific. In some implementations, a snapshot of the gaze target is also rendered in association to the AR overlay on the bus.

Figure 5A:
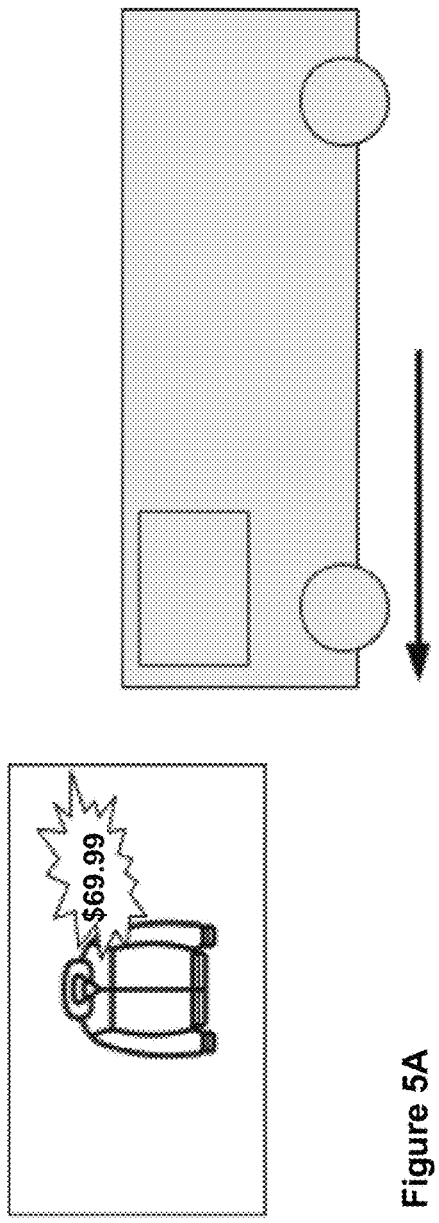
FIG. 5A illustrates an example of a gaze target extracted from a real-world environment with an AR overlay with an occlusion object approaching, in accordance with one implementation of the present disclosure.
Figure 5B:
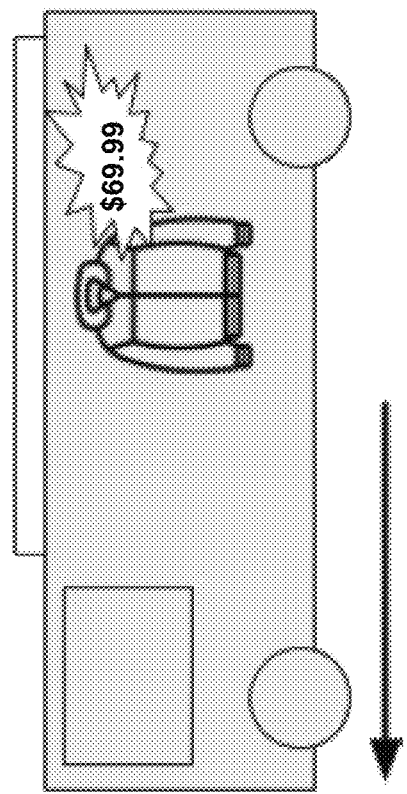
FIG. 5B illustrates an example of a gaze target extracted from a real-world environment with an AR overlay with an occlusion object obscuring the real-world object, in accordance with one implementation of the present disclosure.

FIGS. 5A-5B illustrate an example where the AR overlay is rendered on the occluding object, in some implementations. FIG. 5A shows the gaze target of the user as being a jacket in a shop window, and an AR price overlay is rendered in association to the gaze target in response to detecting the leather jacket is the target of the user's gaze. Additionally, the ML algorithm 140 detects a bus (i.e., occluding object) approaching and is likely to occlude the gaze target by coming between the user and the leather jacket in the shop window. Responsive to detecting the approaching bus, duration of occlusion is computed by identifying at least the size, shape, speed, and direction of the bus. The duration of occlusion is used to define the grace period during which the gaze target and the associated AR overlay need to be maintained for the user's view. Accordingly, a snapshot of the leather jacket and the AR price overlay is rendered on the side of the bus as the bus passes between the user and the gaze target. FIG. 5B illustrates one such example. Once the bus moves away and the gaze target is visible, the AR overlay is rendered in association to the gaze target, as was shown in FIG. 5A.

The various implementations define ways to adjust dimensions of a real-world object so as to allow user to maintain their gaze without having the user to change their gait or motion. Changing the dimensions of the real-world object allows the real-world objects to be accurately identified as the gaze target so that the dimensions of the gaze target can be corrected in accordance to motion characteristics of the user and/or the gaze target. Correcting for position parameters such as gait and motion makes it possible for the user to maintain their gaze on the target long enough to trigger the AR overlay. Various options, such as pin function, delayed view function, rewind function, occlusion consideration, etc., allow the user to consume the information included in the AR overlay during or at a time that is convenient and safe for the user, making this a flexible and useful application. Other advantages will be realized by one skilled in the art after reading the various implementations of the disclosure.

Figure 6:
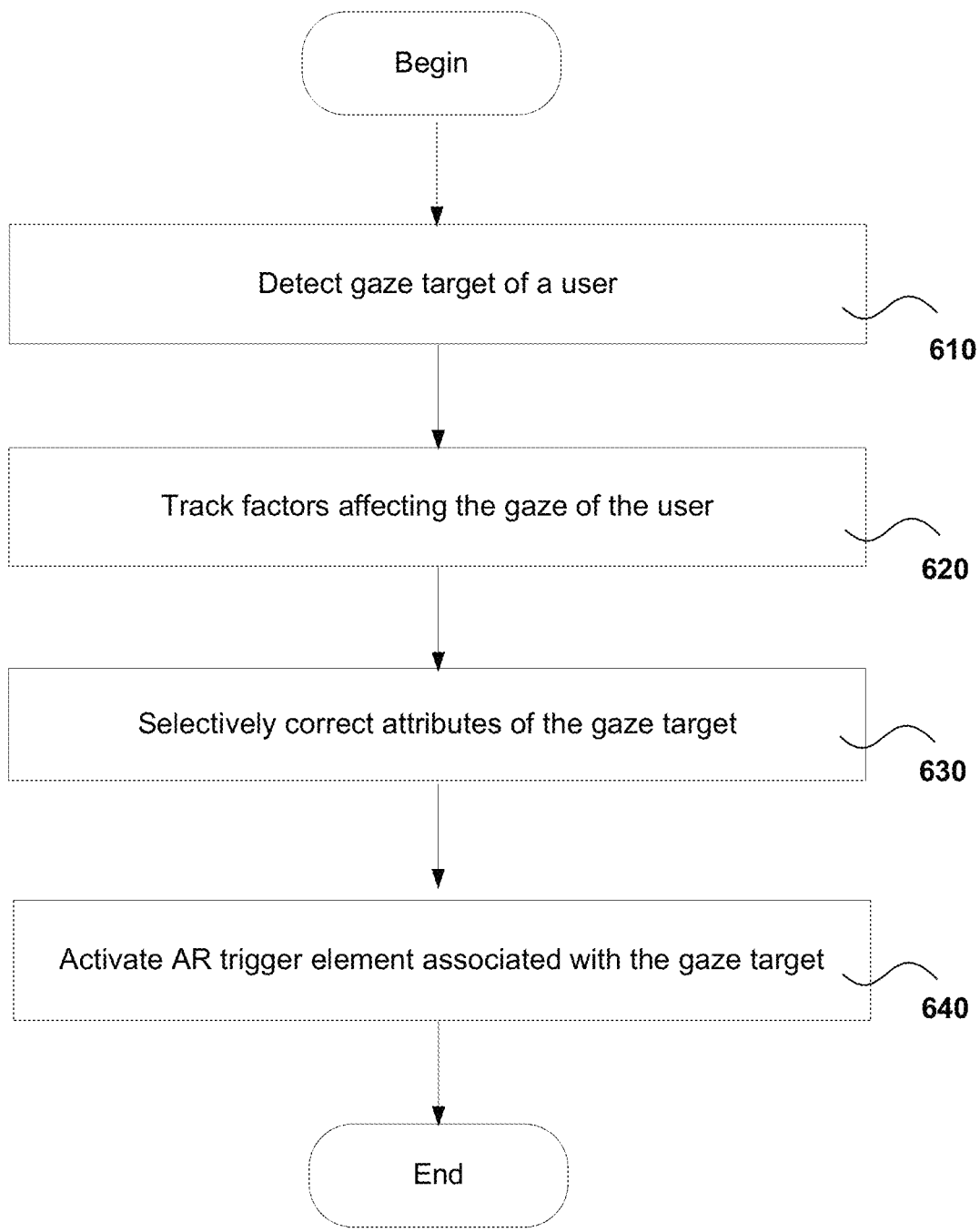
FIG. 6 illustrates a simplified flow of operations of a method for verifying a digital twin of a real-world object in possession of a user, in accordance with one implementation of the present disclosure.

FIG. 6 illustrates flow operations of a method for providing augmented reality (AR) overlay associated with a real-world object, in some implementations. The method begins when a gaze target of a user viewing a real-world environment through a pair of AR glasses is detected, as illustrated in operation 610. The gaze target is one of the real-world objects included in the real-world environment that the user is viewing and is identified by tracking their gaze. The real-world object is established to be the gaze target of the user when the gaze of the user directed at the real-world object lasts for at least a pre-defined period of time. The real-world object that is the gaze target of the user is associated with an AR trigger element. Once the gaze target of the user is established, one or more position parameters of the user are tracked as illustrated in operation 620. The gaze of the user can be affected by position parameters and other motion characteristics, such as gait or motion of the user and/or the motion of the gaze target in relation to the user. The various position parameters and other motion characteristics are used to determine the amplitude of the gait, speed and direction associated with the motion of the user and/or the gaze target.

The position parameters and other characteristics are used to selectively correct one or more attributes of the gaze target, as illustrated in operation 630, so as to allow the user to continue to maintain their gaze on the real-world object representing the gaze target. The one or more attributes are corrected to be in proportion to the one or more identified position parameters, characteristics. For example, the speed and direction of motion of the user in relation to the gaze target are used to proportionately adjust the dimensions of the gaze target so that the gaze target can be easily identified and verified, wherein the verification can be in the form of the user continuing to maintain their gaze on the real-world object. The gaze of the user on the gaze target is used to trigger an AR overlay associated with the real-world object, as illustrated in operation 640. The triggered AR overlay is rendered on a display portion of the pair of AR glasses worn by the user. The AR overlay provides additional information related to the real-world object representing the gaze target.

Figure 7:
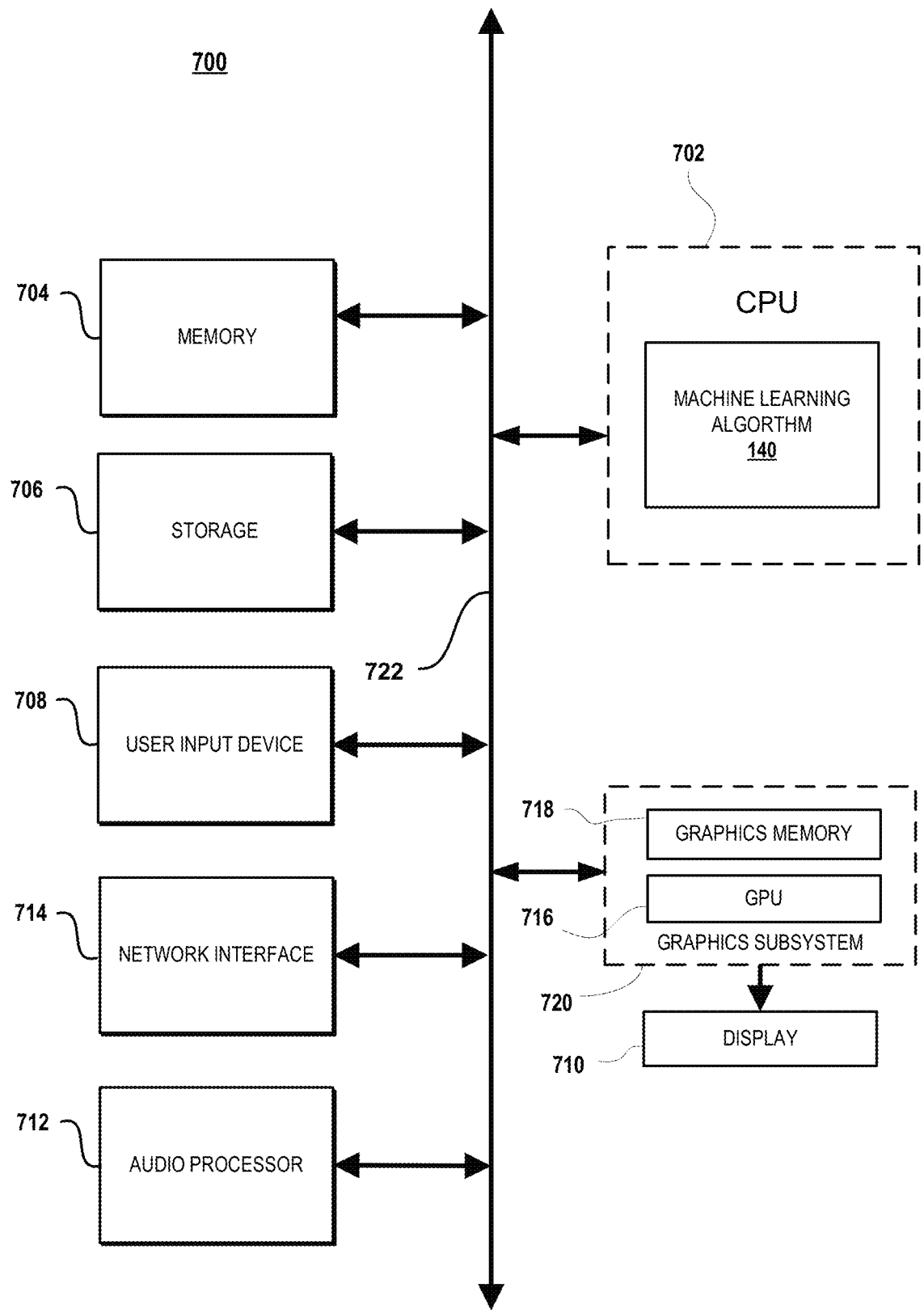
FIG. 7 illustrates components of an example computing device that can be used to perform aspects of the various implementations of the present disclosure.

FIG. 7 illustrates components of an example computing device 700 that can be used to perform aspects of the various embodiments of the present disclosure. This block diagram illustrates computing device 700 that can incorporate or can be a personal computer, video game console, personal digital assistant, a head mounted display (HMD), a wearable computing device, a laptop or desktop computing device, a server or any other digital device, suitable for practicing an embodiment of the disclosure. For example, the device 700 represents a first device as well as a second device in various implementations discussed herein. Device 700 includes a central processing unit (CPU) 702 for running software applications and optionally an operating system. Further, the CPU 702 can include machine learning algorithm 140 with an object recognition algorithm (not shown) embedded therein to use the physical attributes captured for the real-world object in order to identify the real-world object. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be localized to a player playing a game segment (e.g., game console), or remote from the player (e.g., back-end server processor), or one of many servers using virtualization in a game cloud system for remote streaming of game play to client devices.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 714, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from graphics memory 718 to be displayed on display device 710. Display device 710 can be any device capable of displaying visual information in response to a signal from the device 700, including CRT, LCD, plasma, and OLED displays. In addition to display device 710, the pixel data can be projected onto a projection surface. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, embodiments of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for providing augmented reality (AR) overlay, comprising:
    detecting a gaze target of a user viewing a real-world environment through a pair of AR glasses, the gaze target is a real-world object of the real-world environment identified by tracking a gaze of the user, the gaze target associated with an AR trigger element;
    tracking one or more position parameters of the user, the one or more position parameters relate to positional changes of the user relative to the gaze target;
    selectively correcting one or more attributes of the gaze target in an image of the gaze target captured by one or more image capturing devices, the one or more attributes corrected in proportion to the one or more position parameters of the user and returning the image of the gaze target with the corrected one or more attributes for rendering at a display portion of the pair of AR glasses to allow the user to maintain the gaze on the real-world object representing the gaze target during the positional changes of the user; and
    activating the AR trigger element associated with the gaze target when the gaze of the user directed toward the gaze target exceeds a pre-defined threshold of time, the activation causing the AR overlay to render alongside the image of the gaze target with the corrected one or more attributes at the display portion of the pair of AR glasses as the user is viewing the real-world environment, the AR overlay providing information related to the real-world object corresponding to the gaze target.

2. The method of claim 1, wherein tracking the one or more position parameters include tracking a gait of the user as the user is moving in relation to the gaze target, the gait of the user used to dynamically adjust one or more dimensions of the gaze target in proportion to an amplitude of the gait of the user.

3. The method of claim 1, wherein tracking the one or more position parameters include tracking a motion of the user in relation to the gaze target, the motion including a speed and direction, the motion of the user used to dynamically adjust one or more dimensions of the gaze target in proportion to the speed, or the direction, or the speed and direction of motion of the user.

4. The method of claim 1, wherein tracking the one or more position parameters include tracking a gait and motion of the user in relation to the gaze target, the motion and the gait of the user used to dynamically adjust one or more dimensions of the gaze target in proportion to the gait, a speed and a direction of motion of the user in relation to the gaze target.

5. The method of claim 1, wherein tracking the one or more position parameters include tracking a motion of the gaze target in relation to the user, the motion of the gaze target including a target speed and target direction, the motion of the gaze target used to dynamically adjust one or more dimensions of the gaze target in proportion to the target speed, or the target direction, or the target speed and target direction identified from the motion of the gaze target.

6. The method of claim 1, wherein selectively correcting the one or more attributes includes dynamically adjusting one or more dimensions and proportion of the gaze target captured in the image in accordance to the one or more position parameters, the dynamic adjustment done without affecting the one or more position parameters so as to allow the user to maintain the gaze on the gaze target.

7. The method of claim 1, wherein selectively correcting the one or more attributes includes selectively adjusting two dimensional attributes or three-dimensional attributes of the gaze target captured in the image to account for the one or more position parameters affecting the gaze of the user.

8. The method of claim 7, wherein the gaze of the user is affected by motion of the gaze target, the motion of the gaze target includes a target speed, and target direction, and
wherein selectively correcting the one or more attributes of the gaze target captured in the image further includes selectively adjusting one or more attributes of the gaze target in the image to account for the target speed and the target direction associated with the motion of the gaze target.

9. The method of claim 1, wherein activating the AR trigger element includes activating a pin function to cause the AR overlay to render in a portion of the display portion of the pair of AR glasses for a period of time after the gaze target is beyond gaze of the user, the pin function activated using a gaze-based interface, or an interface activated by a voice command or a gesture or a touch, or specified in a user profile setting, and
wherein the period of time is specified by the user or is preset.

10. The method of claim 1, wherein activating the AR trigger element includes activating a delayed view function from a user interface, wherein activating the delayed view function includes,
storing the image of the gaze target with the corrected one or more attributes with associated AR overlay for later recall by the user.

11. The method of claim 1, wherein activating the AR trigger element includes,
automatically storing a history of a last pre-defined number of AR overlays, each AR overlay associated with a corresponding gaze target identified by tracking the gaze of the user and associated with the corresponding AR trigger element; and
providing a rewind option on a user interface for user selection of a particular AR overlay stored in the history, the user selection causing rendering of the AR overlay on the display portion of the pair of AR glasses for user consumption.

12. The method of claim 1, wherein activating the AR trigger element further includes,
predicting a second object occluding the gaze target, the prediction determined by tracking position of real-world objects of the real-world environment in relation to the gaze target, the occlusion preventing a clear view of the gaze target for the user; and
presenting the AR overlay associated with the gaze target with the corrected one or more attributes for a duration of time the gaze target is predicted to be occluded by the second object.

13. The method of claim 12, wherein the predicting includes,
collecting attributes of each real-world object of a plurality of real-world objects that is part of the real-world environment, the attributes of the plurality of real-world objects used to identify select ones of the real-world objects that are stationary and select other ones of the real-world objects that are moving; and
analyzing the attributes of each of the select other ones of the real-world objects that are moving to identify the second object that is moving toward the gaze target and predicting a time frame when the second object will occlude the gaze target, the predicted time frame used for rendering the AR overlay associated with the gaze target for a duration of the predicted time frame in the display portion of the pair of AR glasses.

14. The method of claim 13, wherein a length of the predicted time frame varies based on motion of the second object and motion of the gaze target, and
wherein the attributes influencing the length of the predicted time frame includes at least a size, a shape, a direction and a speed of movement of the second object and the gaze target.

15. The method of claim 13, wherein the AR overlay and the image of the real-world object representing the gaze target are superimposed over the second object for the duration of the predicted time frame, and upon expiration of the predicted time frame removing the image of the real-world object representing the gaze target and the AR overlay from the second object.

16. The method of claim 1, wherein the pre-defined threshold of time being dynamically adjusted down every time the gaze of the user is directed at the gaze target.

17. A method for providing augmented reality (AR) overlay, comprising:
tracking a gaze of a user to identify a gaze target that has captured an interest of the user, the gaze target identifies a real-world object within a real-world environment viewed by the user through a pair of AR glasses, the gaze target is associated with an AR trigger element;
detecting movement of the user in relation to the gaze target, the movement analyzed to identify one or more position parameters of the user;
selectively correcting one or more attributes of an image of the gaze target in proportion to the one or more position parameters and returning the image of the gaze target with the corrected one or more attributes for rendering on a display portion of the pair of AR glasses to allow the user to maintain the gaze on the real-world object representing the gaze target; and
activating the AR trigger element associated with the gaze target when the gaze of the user on the gaze target exceeds a pre-defined threshold of time, the activation causing the AR overlay to render alongside the image of the gaze target with the corrected one or more attributes at the display portion of the pair of AR glasses as the user is viewing the real-world environment, the AR overlay providing information related to the real-world object corresponding to the gaze target.

18. The method of claim 17, wherein selectively correcting further includes,
detecting movement of the gaze target in relation to the movement of the user, the movement of the gaze target analyzed to identify additional positional parameters of the user; and performing additional correction to the one or more attributes in proportion to the movement of the gaze target.

19. The method of claim 17, wherein activating the AR trigger element to render the AR overlay further includes, collecting attributes of each real-world object of a plurality of real-world objects in the real-world environment, the attributes used to identify select ones of the plurality of real-world objects that are stationary and select other ones of the plurality of real-world objects that are moving; and analyzing the attributes of each of the select other ones of the real-world objects that are moving to identify a second object that is moving to occlude the gaze target and predicting a time frame when the second object will occlude the gaze target, the predicted time frame used to render the AR overlay associated with the gaze target for a duration of the predicted time frame in the display portion of the pair of AR glasses.

* * * * *